(12) United States Patent
Errington

(10) Patent No.: US 6,927,645 B2
(45) Date of Patent: Aug. 9, 2005

(54) ELECTRONIC COMPONENT STRUCTURED TO COMPENSATE FOR CABLE LOSSES AND METHOD OF PRODUCTION

(75) Inventor: Monte N. Errington, Palm City, FL (US)

(73) Assignee: Broadband International, Inc., Medley, FL (US)

( * ) Notice: Subject to any disclaimer, the term of this patent is extended or adjusted under 35 U.S.C. 154(b) by 0 days.

(21) Appl. No.: 10/448,513

(22) Filed: May 30, 2003

(65) Prior Publication Data

US 2004/0056732 A1 Mar. 25, 2004

Related U.S. Application Data

(63) Continuation-in-part of application No. 09/637,775, filed on Aug. 11, 2000, now Pat. No. 6,583,684.

(51) Int. Cl.[7] .............................................. H04B 3/04
(52) U.S. Cl. ...................... 333/28 R; 333/170; 333/175
(58) Field of Search ............................. 333/28 R, 170, 333/175

(56) References Cited

U.S. PATENT DOCUMENTS

| | | | |
|---|---|---|---|
| 2,798,900 A | 7/1957 | Bradley | ....................... 330/132 |
| 3,079,461 A | 2/1963 | Keizer | ......................... 348/647 |
| 4,151,490 A | 4/1979 | Bazin | ............................ 333/16 |
| 5,561,404 A | * 10/1996 | Ross | .......................... 333/28 R |
| 5,805,031 A | * 9/1998 | Cheng | ........................ 333/28 R |
| 6,107,896 A | * 8/2000 | Elco et al. | ................. 333/28 R |
| 6,583,684 B1 | * 6/2003 | Errington | ................... 333/28 R |
| 6,646,519 B2 | * 11/2003 | Sperber | ..................... 333/28 R |

* cited by examiner

Primary Examiner—Michael Tokar
Assistant Examiner—Lam T. Mai
(74) Attorney, Agent, or Firm—Malloy & Malloy, P.A.

(57) ABSTRACT

An electronic component and a method of its structuring wherein the component is intended to compensate for "cable loss" attributable to the decay of certain signal characteristics including both frequency and amplitude decay over long distances of coaxial cable of the type utilized in CATV-MATV broadband cable facilities. The method comprises the continuous processing of a signal through a base circuit and monitoring the predetermined signal characteristics including frequency and amplitude. A Circuit modifications are sequentially applied to the base circuit and balanced to approximate stabilization of the signal characteristics until the base circuit and combined plurality of circuit modifications closely approximate signal stabilization. Overcoming remaining variances between the modified signal characteristics and complete signal stabilization is accomplished by applying a transient influence to the base circuit and selectively varying resistance, inductance and capacitance if needed to accomplish final signal stabilization.

22 Claims, 3 Drawing Sheets

ELECTRONIC COMPONENT STRUCTURED TO COMPENSATE FOR CABLE LOSSES AND METHOD OF PRODUCTION

This is a continuation-in-part application of presently pending U.S. patent application Ser. No. 09/637,775 filed on Aug. 11, 2000, which has matured into U.S. Pat. No. 6,583,684 and which is included herein, in its entirety, by reference.

BACKGROUND OF THE INVENTION

1. Field of the Invention

The present invention is directed towards an electronic component and a method of structuring it which does not require manual tuning or alignment during its manufacture. The component may include, but is not limited to, an equalizer which compensates for varying degrees of cable loss in CATV/MATV broadband network facilities. A trial and error procedure is implemented which includes applying a plurality of circuit modifications to a base circuit in an effort to initially approximate stabilization of signal characteristics of a signal being continuously processed through the base circuit and monitoring the signal characteristics to determine the effect of applying the approximating circuit modifications.

2. Description of the Related Art

In the communication industry, a cable television/master antenna television (CATV/MATV) broadband network collects available intelligent information from a variety of sources including antennas, satellite receivers, local originating signals, phone lines, and/or return paths of the broadband network in two-way operational networks. It is of course well recognized that CATV/MATV broadband networks utilize vast quantities of coaxial cable to establish and transmit such collected information. The frequency spectrum for these broadband networks usually range from 5 to 450, 550, 750, 860, or 1000 MHZ. Each signal is given a specific frequency in the network spectrum. The transmitted or processed signals as well as the collected information are combined for transmission onto a coaxial cable to be distributed throughout the CATV/MATV broadband network.

More specifically, operational details of this type of broadband network comprise the connection of the coaxial cable to lasers for transmission of the combined signal/information over fiber optics and the further transmission and/or amplification onto other coaxial cables by known passive or active methods. Finally, the collected signals are routed to the subscriber by means of fiber optics and cables, which are commonly referred to as the "trunk" or "back bone" of the feeder system. The feeder system comprises a variety of different broadband components, which include coaxial cables, multiple port taps, amplifiers, splitters, attenuators and equalizers. The feeder system then distributes the intelligent information, using coaxial cable, to the subscribers or end users of a CATV/MATV broadband network.

One of the most common and problematic occurrences involved with the use of extended lengths of coaxial cable, in the manner set forth above, is the existence of "cable loss". Such losses deteriorate transmission of information to the subscriber or end user as well as derogatorily effect the trunk and feeder systems. Cable loss is more specifically evidenced by a decay of certain signal characteristics including, but not necessarily limited to, amplitude decay and frequency decay.

In order to compensate for such cable losses certain electronic components have been developed for inclusion in the broadband network communication system. Prevalent among such electronic components are equalizers and simulators. Equalizers are designed and structured to compensate for frequency and amplitude decay of signals transmitted over long distances of coaxial cable used in broadband networks, as set forth above. Simulators compensate for short spans of coaxial cable and effectively function as small pieces of coaxial cable. However, despite the concerted efforts to develop effective compensating electronic components, including equalizers, simulators, amplifiers, etc., present manufacturers of these components have encountered problems with their operational design and/or manufacture. Such problems are most commonly demonstrated by inconsistent and unreliable performance in overcoming cable losses.

A review of prior art design and manufacturing standards of equalizers and like electronic components reveals that their notoriously inconsistent performance is most likely attributable to manually performing tunning and/or alignment procedures on these electrical components in order that such components meet intended or standard operational specifications dependent on their rating and intended use. In typical fashion, such required tunning and aligning procedures are done manually resulting in increased time and cost involved in the manufacturing of such components. More importantly, no matter how skilled or well trained the worker, human error is a significant factor in the accurate performance of the required tunning and alignment procedures. Therefore production, in terms of quantity of products produced is significantly delayed and the products that are produced are at best inconsistent in terms of meeting recognized industry standards or specifications and performance characteristics.

Accordingly, there is a long recognized problem in the segment of the communication industry dealing with the operation and performance of CATV/MATV broadband network facilities, which is directly associated with the inability to consistently compensate for cable losses associated with the use of extended lengths of coaxial cable.

SUMMARY OF THE INVENTION

The present invention is directed to an electronic component and a method of its design and structuring in a manner which eliminates the necessity for manually tunning and/or aligning the component during its production. As set forth in greater detail hereinafter, the method of structuring the electronic component is particularly directed to an equalizer component of the type which is intended to compensate for "cable loss" invariably present when utilizing extensive lengths of coaxial cable in Cable Television/Master Antenna Television (CATV/MATV) broadband network facilities. However, it is emphasized that the method of the present invention is not limited to the structuring of an equalizer component, of the type set forth above. To the contrary, the method of the present invention, including what may generally be referred to as a "trial and error" technique, is applicable for the initial design and structuring of a variety of different electronic components.

It is of course recognized that the aforementioned cable loss is clearly evidenced and/or attributable to the decay of certain standard characteristics of the signals as they are being transmitted over the coaxial cable. When referring to equalizer components, the signal characteristics primarily involved include both frequency and amplitude. Accordingly, electronic equalizer components, as utilized in broadband network facilities of the type set forth herein, are conventionally designed and structured to compensate for frequency and amplitude decay of signals which, as set forth above, are transmitted over long distances of coaxial cable. Naturally, other electronic components serve similar compensatory functions, wherein such additional electronic components include simulators, amplifiers, etc. Accordingly, the method of the present invention is primarily, but not exclusively, directed to the structuring of equalizer components in a manner which compensates for the decay of predetermined signal characteristics, particularly including frequency and amplitude, of signals of known strength transmitted over known lengths of coaxial cable.

Further, the method of the present invention accomplishes the structuring of equalizer components in a manner which eliminates the necessity for the manual tunning and/or alignment procedures typically associated with the manufacture of equalizers and other electronic components. As will be recognized by those familiar with this segment of the communication industry, inconsistent operational performance of conventional equalizers is attributable, at least in large part, to human errors associated with the performance of the tunning and alignment procedures and/or to the methodology of the procedures actually used. Therefore, the unique method of the present invention provides for a design and structuring of an equalizer component, as well as other electronic components, in a manner which eliminates the necessity of performing any such manual tunning and/or alignment procedures and thereby eliminates or at least significantly reduces the inconsistency in the performance of such electronic components, as well as increasing production output and decreasing cost of manufacture when mass producing such components.

More specifically, the method of the present invention comprises the initial utilization and design of a predetermined base circuit which preferably comprises a bridge-T configuration. Such a bridge-T configured base circuit preferably incorporates a resistor series and shunt including a plurality of circuit components of pre-established resistance. These circuit components are selected to represent a pre-established resistance value which is dependent upon the estimated cable loss. The amount of cable loss is dependent upon the length of the coaxial cable as well as a variety of other associated operational factors. Once the base circuit is established, a signal is continuously processed through the base circuit. The processed signal is visually monitored, using conventional monitoring equipment, in order to observe predetermined signal characteristics. In the present case of designing and structuring an equalizer component, both frequency characteristics and amplitude characteristics of the processed signal are monitored.

Thereafter, a trial and error technique is implemented, as indicated above, to the extent of providing a plurality of approximating circuit modifications to the base circuit for purposes of directly affecting the predetermined signal characteristics of the processed signal being monitored. As will be explained in greater detail hereinafter, each of the aforementioned circuit modifications are applied sequentially and are applied to the base circuit in a "balanced" manner, as also explained hereinafter. The circuit modifications each include at least one circuit component, added to the base circuit, wherein the at least one circuit component of each modification is of a pre-established rating or value and wherein each component affects at least one of the predetermined frequency and amplitude characteristics of the signal being monitored.

Further, each of the circuit modifications represent an approximation of signal characteristic variance, wherein the addition of each circuit component included in each of the circuit modifications attempts to "stabilize" the particular predetermined signal characteristic, with the end purpose being to consistently produce stabilized processed signals. More specifically the end result of the method of the present invention, including the trial and error procedure implemented, is directed to the creation of an equalizer or like electronic component which consistently and efficiently compensates for cable loss. The accomplishment of a consistently performing equalizer is therefore evidenced by the transmission of a signal through the component which is visually observed to have eliminated the decay of the predetermined signal characteristics, including amplitude and frequency. Once the signal and therefore the circuit has been "stabilized", further manual tunning and/or alignment of the component is no longer required to meet the intended industry standards and rating of the component.

The aforementioned trial and error procedure implemented in the method of the present invention is primarily due to the fact that the one or more circuit components included in the approximating circuit modifications are typically only available in standard ratings or values. Therefore, utilization of the aforementioned circuit components, each of which have a standard pre-established resistance and/or a standard pre-established capacitance and/or a standard pre-established inductance, provide only an approximation of the amount of variance required to modify the individual signal characteristics. As a result, each circuit modification is added to the base circuit for purposes of more closely accomplishing the amount of change needed for each of the predetermined signal characteristics, including frequency and amplitude, required for signal stabilization.

Finally, the method of the present invention comprises the application of one or more "transient influences" to the component for purposes of determining the final amount of variance still existing in each signal characteristic, which must be overcome before complete stabilization of the signal is established. As used herein, the term "transient influence" may be more specifically defined, as a temporary modification applied to the equalizer, or certain circuit components thereof, which lasts only a brief period of time and which indicates the remaining amount of variance in each of the predetermined signal characteristics. Such transient influences are distinguishable from the one or more circuit components which define the approximating circuit modifications applied to the base circuit, wherein such circuit components and approximating circuit modifications in fact become a permanent part of the equalizer or other electronic component being structured. In more simplistic terms, each of the one or more transient influences applied to the equalizer component affects the signal being processed thereby and may be observed by a change in the predetermined signal characteristics, as the transient influence is applied and subsequently removed. This of course differs from the approximating circuit modifications in that such transient influences are removed from the component and do not become a part thereof.

The determination of the final amount of variance or modification which must be applied to the circuit is thereby determined by the one or more transient influences, as set forth above, wherein final modifications of the circuit can be performed to accomplish structuring of an equalizer or like electronic component which consistently processes a stabilized signal.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The present invention relates to an electronic component and to a method of structuring an electronic component. The electronic component comprises, but is not necessarily limited to, an equalizer component of the type used to compensate for cable losses which occur in extensive lengths of coaxial cable of the type used in CATV/MATV broadband network facilities. As shown in the accompanying FIGS., cable loss, of the type referred to herein, is primarily evidenced by the decay of certain signal characteristics of signals being transmitted through the coaxial cable and is more specifically demonstrated in FIG. 2A. Accordingly, one preferred embodiment of the present invention is directed to a method of structuring an equalizer component which will compensate for the decay of predetermined signal characteristics, including frequency and amplitude. More importantly, structuring of the equalizer or like electronic component is accomplished in a manner which eliminates the necessity for performing tunning and/or alignment procedures normally required during the manufacturing of standard equalizers other compensatory electronic components.

Figure 2A:
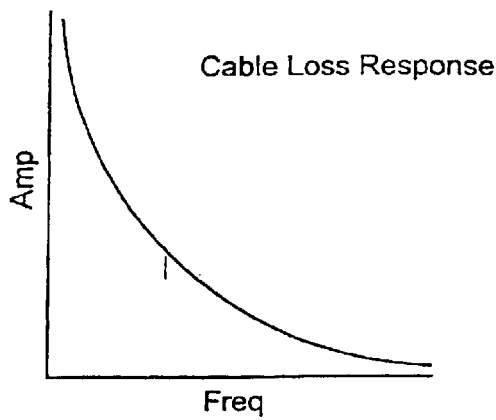
FIG. 2A is a schematic representation of signal characteristics demonstrating the response of cable loss in a coaxial cable.
Figure 2B:
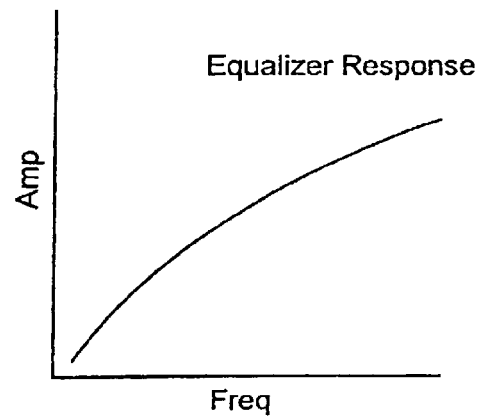
FIG. 2B is a schematic representation of signal characteristics demonstrating the inclusion of an equalizer component of the present invention.
Figure 2C:
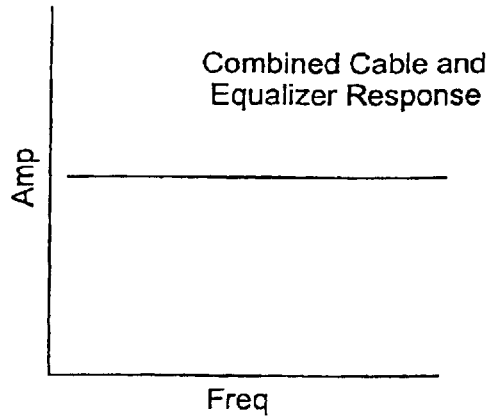
FIG. 2C is a schematic representation of a stabilized signal resulting from the inclusion of an equalizer component of the present invention inserted in appropriate circuitry to overcome cable loss response.

For purposes of clarity FIG. 2B represents signal characteristics in response to or affected by an equalizer component structured in accordance with the method of the present invention without being affected or demonstrating any response due to the cable loss schematically presented in FIG. 2A. In addition, FIG. 2C represents a stabilized signal being processed through circuitry and/or coaxial cable, wherein the cable loss response demonstrated in FIG. 2A is overcome by the influence of an equalizer component of the present invention, as demonstrated in FIG. 2B. Further, the method of the present invention comprises the utilization of what may generally be referred to as "trial and error" techniques to structure an equalizer component which serves to stabilize signal characteristics, including amplitude and frequency, of a signal transferred over a coaxial cable and subjected to the normally decaying influences of cable loss.

Figure 1:
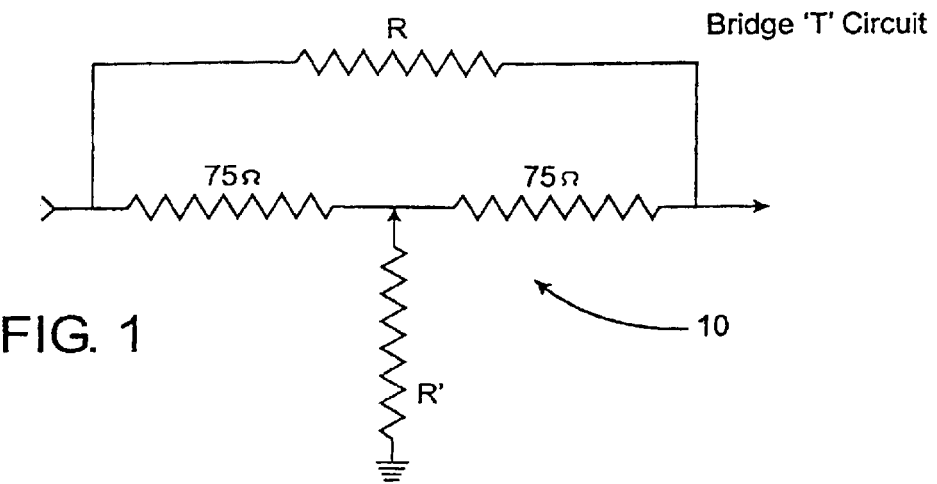
FIG. 1 is a circuit diagram of a bridge-T base circuit utilized in the formation of an equalizer or like electronic component incorporating the method of the present invention.
Figure 3:
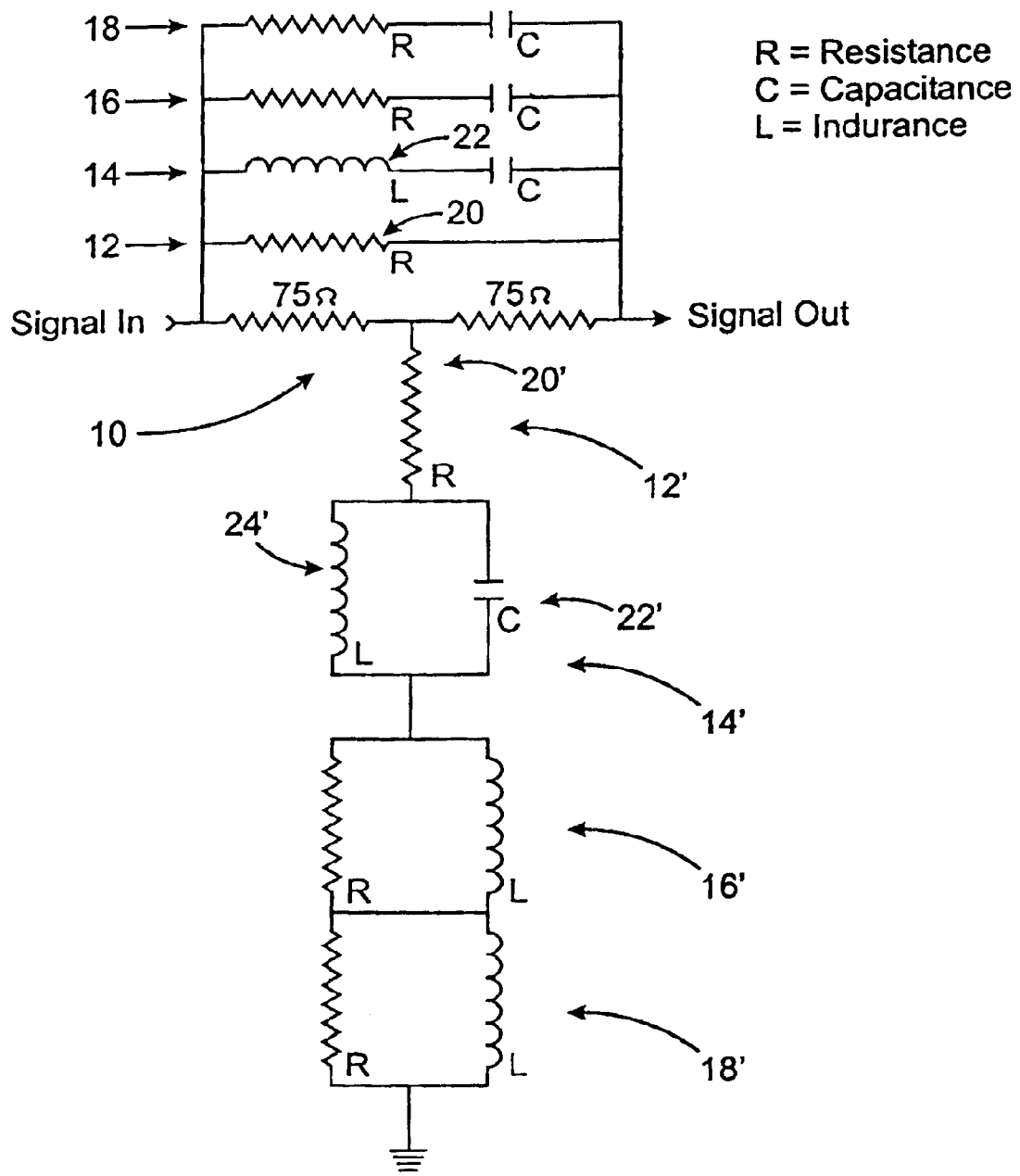
FIG. 3 is a representative circuit diagram of the base circuit of FIG. 1 and a plurality of sequentially added circuit modifications utilized in the method of the present invention to approximate signal stabilization.

More specifically, and with reference to the accompanying Figures, the method of the present invention utilizes and defines a base circuit generally indicated as 10 in FIGS. 1 and 3. The base circuit 10 preferably comprises a bridge-T configuration incorporating a resistance series and shunt. As represented in FIGS. 1 and 3, the base circuit includes a plurality of circuit components of pre-established resistance. By way of example, the circuit components, in the form of resistors are per-rated at 75 ohms. The rating of 75 ohms is established utilizing a standardized table of conversions indicating conversion factors between voltage and power measurements for the range of signal levels commonly encountered in a broadband network. Standard equations are utilized in the formation of such a table of conversions. An estimate of cable loss is based on the length of cable, voltage and power measurements, signal levels, etc. Therefore, circuit components of the base circuit 10 may begin with a pre-rated value of, for example 75 ohms.

The method further comprises the processing of a signal on a substantially continuous basis, wherein the signal is initially processed through the base circuit 10. Concurrently, the processed signal is visually monitored by observance of the predetermined signal characteristics, including both amplitude and frequency, as respectively represented by the X and Y axis of the schematic representation of FIGS. 2A through 2C and 4A through 4D. Of course, the end goal is to structure an equalizer component which is consistently operative, and effectively compensates for both amplitude and frequency decay of signals being processed over a predetermined length of coaxial cable. Therefore, representation of a processed signal in terms of its amplitude and frequency characteristics, when processed through the unmodified base circuit 10, is demonstrated in FIG. 4A. Clearly, the processed signal as represented in FIG. 4A shows undesirable variance in both amplitude and frequency which is overcome utilizing the method of the present invention.

The structuring of a consistently performing equalizer component may be accomplished by approximating changes in both the predetermined signal characteristics of amplitude and frequency, by applying circuit modifications to the base circuit 10 in a sequential manner. With primary reference to FIGS. 3 and 4A through 4D, the method of the present invention comprises the sequential application of a plurality of circuit modifications 12, 14, 16, 18, etc. and the balancing of each circuit modifications, relative to the base circuit 10, through the provision of equal but opposite circuit modifications 12,12', 14,14', 16,16', 18,18', etc. The number of circuit modifications 12, 14, 16, 18, may vary dependent upon the effect each of the circuit modifications have on the predetermined signal characteristics of amplitude and frequency as demonstrated in FIGS. 4A through 4D. FIGS. 4A through 4D represent visual monitoring of signal characteristics as a signal is being processed through the circuit of FIG. 3, comprising the base circuit 10, as the circuit modifications 12,12'; 14,14'; 16,16' and 18,18' are sequentially applied.

Further each of the approximating circuit modifications 12, 14, 16, 18 comprises at least one circuit modifying component of pre-established rating or value. With reference to FIG. 3, the individual resistor, capacitor and inductor circuit components are respectively identified with the conventional designations "R", "C" and "L". As also shown in FIG. 3, a first approximating circuit modification 12 includes a single circuit modifying component 20 having a pre-established resistance, which is balanced by a substantially equivalent compensating component 20' also applied to the base circuit 10 so as to provide a balanced overall circuit configuration. Accordingly, the various approximating circuit modifications 12, 14, 16, 18 each include at least one circuit modifying component, wherein each of the one or more circuit modifying components are intended to affect a predetermined one of the signal characteristics of either amplitude or frequency. As is recognized in the structuring of the represented circuitry, the adding of a reactive component, such as a resistor, inductor, capacitor, etc. will affect the amplitude characteristic of the processed signal and the adding of a circuit component of pre-established capacitance, such as a capacitor will affect the frequency characteristic of a processed signal.

Figure 4A:
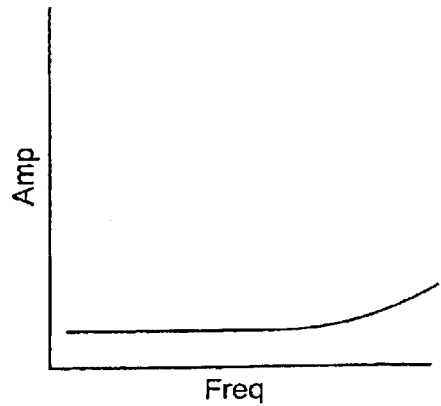
FIGS. 4A through 4D are each schematic representation of predetermined signal characteristics of a signal being processed through the circuit of FIG. 3, including the sequentially applied approximating circuit modifications.

Accordingly, initial processing of a signal through the base circuit 10, is evidenced by the signal characteristic of amplitude (X axis) and frequency (Y axis) of FIG. 4A. In order to provide a stabilized circuit, as substantially demonstrated in FIGS. 2A and 4D, the signal must demonstrate predetermined amplitude and frequency characteristics which are within the pre-set standard for an equalizer structure of a predetermined rating, dependent on its use in a CATV/MATV broadband network facility. In that the various circuit modifying components which at least partially define the approximating circuit modifications 12, 14, 16, 18 of FIG. 3 are available in pre-set ratings, a plurality of the approximating circuit modifications must be sequentially applied to the base circuit 10 in order to eventually establish a stabilized signal having the preferred amplitude and frequency signal characteristics demonstrated in FIGS. 2A and 4D.

Therefore, the application of the first approximating circuit modification 12 may include the circuit compensating component 20 and be compensated for by the resistance of the balancing compensating component 20' as at 12'. The result will be a processed signal having relatively stable frequency characteristics but unsuitable amplitude characteristics as demonstrated in FIG. 4A. The trial and error procedure incorporated within the method of the present invention therefore determines that an additional approximating circuit modification 14 comprising one or more circuit modifying components, must be applied to the base circuit 10 and offset or be balanced by one or more compensating components comprising the circuit segment 14'. The result may be a processed signal having the amplitude and frequency characteristics as demonstrated in FIG. 4B, wherein the frequency range demonstrated indicates an increased amplitude from the processed signal of FIG. 4-A. As indicated above, it may be determined that more than one circuit modifying component is required in the circuit modification 14 after the base circuit 10 has been initially modified by the circuit modification 12, in order to raise the amplitude within the lower and mid-frequency ranges. Accordingly, the circuit modification 14 includes two circuit modifying components 22 and 24 respectively having a pre-established inductance and a pre-established capacitance. As a result the frequency is modified by inclusion of the inductance element 22 and the amplitude is modified or raised, at least in the mid-frequency range, through the inclusion of a circuit component 24 having a pre-established capacitance.

Figure 4B:
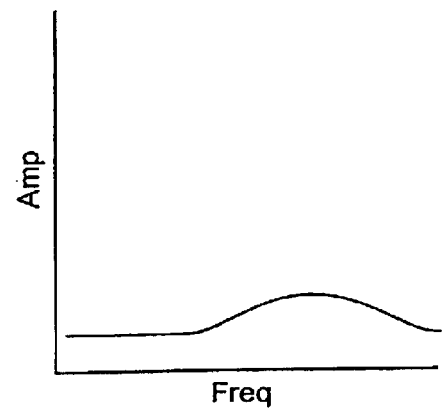
Figure 4C:
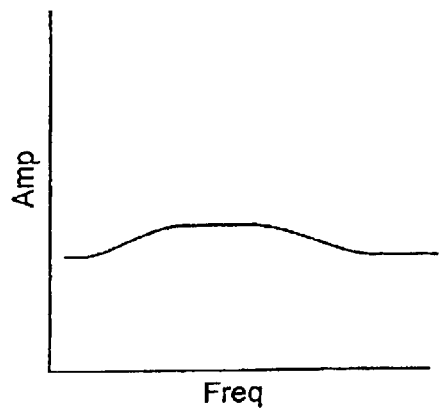
Figure 4D:
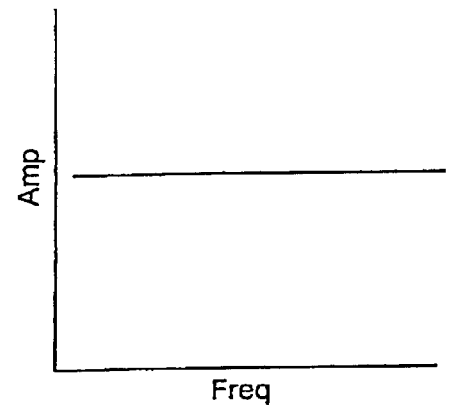

Additional circuit modifications are thereafter included as at 16 and 18 and balanced out as at 16' and 18', relative to the base circuit 10, in order to provide various circuit components to respectively modify both the amplitude and frequency characteristics, thereby establishing a substantially stabilized signal and consistently operative electronic component as substantially indicated in FIG. 4D.

In addition to the above, it is important to note that the method of the present invention also includes the application of at least one but sometimes at least two transient influences to the circuit as modified in FIG. 3. The purpose of the application of the one or more transient influences is to determine the final amount of the variance that exists between each of the signal characteristics of amplitude and frequency, in order to provide a final stabilized signal having the preferred amplitude and frequency characteristics, which may be evidenced by the visual indication of a processed signal substantially as indicated in FIG. 4B. The transient influence is herein defined as a temporary, short lasting application of an influence which affects either amplitude or frequency and which is applied to the circuit for a short time only, to determine the amount of final variance needed to be overcome to accomplish the stabilized circuit of FIGS. 2A and 4D. More specifically, one transient influence can be defined as the mere touching by the hand of a person, of the circuit of FIG. 3 and in particular a capacitor component of the modified circuit of FIG. 3, thereby indicating a slight variance or remaining variance needed to obtain the preferred frequency characteristic of FIG. 4D. A second transient influence may be the temporary location of a ferrite material in close proximity to a circuit component of pre-established inductance in order to determine any remaining variance in the amplitude characteristic of a processed signal that must be overcome in order to structure an electronic component, such as an equalizer component, which consistently processes a signal which is stabilized, in terms of signal characteristics of amplitude and frequency.

Accordingly, the application of the one or more transient influences results in an indication of a "return loss". When the transient influence supplied is a touching of a person's finger onto a portion of the component being structure and results in an increase in the return loss, a decrease in capacitance is indicated. To the contrary, when a decrease in return loss is indicated by a touching of the component, an increase in capacitance is indicated, in order to accomplish final stabilization of the signal and consistent operation of the circuit. Also, if the bringing of a ferrite material object in close proximity to the inductive elements or other predetermined portion of the circuit of FIG. 3 results in an increase in return loss, a decrease in inductance is to be applied to the circuit. To the contrary, the indication of a decrease in return loss indicates the necessity of applying an increase in inductance to the circuit of FIG. 3 and/or the component in order to obtain a stabilized signal and a consistently performing equalizer component.

The result of the trial and error procedure incorporated within the method of the present invention as set forth above results in the formation of an equalizer component which does not require the tuning and/or alignment procedures normally performed and required during the manufacturing of such equalizer components and which are typically applied manually resulting in human error and inconsistent performance characteristics in the conventionally manufactured equalizer. Elimination of the manual tuning and alignment procedures therefore increases production output, lowers cost and more importantly provides an equalizer demonstrating consistent performance.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An electronic component structured to compensate for cable losses along a coaxial cable, said electronic component comprising:
   a) a base circuit,
   b) a plurality of circuit modifying components each structured to at least approximate stability of a signal processed through said base circuit,
   c) a plurality of compensating components each applied to said base circuit in a balanced orientation relative to a predetermined one of said plurality of circuit modifying components,
   d) said plurality of circuit modifying components each structured to affect a predetermined signal characteristic of said processed signal, and
   e) said plurality of circuit modifying components collectively responsive to said base circuit to effect stabilization thereof.

2. An electronic component as recited in claim 1 wherein said predetermined signal characteristics include frequency.

3. An electronic component as recited in claim 1 wherein said predetermined signal characteristics include amplitude.

4. An electronic component as recited in claim 1 wherein at least one of said plurality of circuit modifying components demonstrates a pre-established resistance relative to said processed signal.

5. An electronic component as recited in claim 4 wherein said one circuit modifying component is structured to affect an amplitude characteristic of said processed signal.

6. An electronic component as recited in claim 1 wherein at least one of said circuit modifying components demonstrates a pre-established capacitance relative to said processed signal.

7. An electronic component as recited in claim 6 wherein said one circuit modifying component is structured to affect an amplitude characteristic of said processed signal.

8. An electronic component as recited in claim 7 wherein at least one other of said plurality of circuit modifying components demonstrates a pre-established resistance to said processed signal.

9. An electronic component as recited in claim 8 wherein said one other circuit modifying component is structured to affect an amplitude characteristic of said processed signal.

10. An electronic component as recited in claim 1 wherein said plurality of circuit modifying components are sequentially disposed relative to said base circuit.

11. An electronic component as recited in claim 10 wherein said plurality of circuit modifying components are connected in parallel to said base circuit.

12. An electronic component as recited in claim 10 wherein said plurality of compensating components are sequentially disposed relative to said base circuit.

13. An electronic component as recited in claim 10 wherein said plurality of compensating components are connected in parallel to said base circuit.

14. An electronic component as recited in claim 13 wherein said plurality of said circuit modifying components are connected in parallel to said base circuit.

15. An electronic component as recited in claim 1 further comprising an application of at least one transient influence to at least one of said plurality of circuit modifying components.

16. An electronic component as recited in claim 15 wherein said transient influence is determinative of any remaining variance of the predetermined signal characteristics needed to accomplish signal stabilization.

17. An electronic component as recited in claim 16 wherein said transient influence comprises a physical touch of said at least one circuit modifying component.

18. An electronic component as recited in claim 16 wherein said transient influence comprises a ferrite material disposed in close proximity to said at least one circuit modifying component.

19. An electronic component as recited in claim 1 wherein said base circuit comprises a bridge-T circuit.

20. An electronic component as recited in claim 1 produced by a method comprising applying a transient influence to determine a remaining variance of the predetermined signal characteristics needed to accomplish signal stabilization.

21. An electronic component as recited in claim 20 wherein the method further comprises applying the transient influence by at least physically touching one of the plurality of circuit components.

22. An electronic component as recited claim 20 wherein the method further comprises applying the transient influence by positioning a ferrite material in close proximity to the circuit components of pre-established capacitance.

* * * * *